(12) United States Patent
Pemberton et al.

(10) Patent No.: US 8,389,090 B2
(45) Date of Patent: *Mar. 5, 2013

(54) METHOD AND DEVICE FOR PREVENTING PETS FROM CLAWING HOME FURNISHINGS

(75) Inventors: Bonnie Pemberton, Fort Worth, TX (US); Frank A. Wolfe, Acton, TX (US)

(73) Assignee: Pioneer Fe-Lines, LLC, Cedarburg, WI (US)

( * ) Notice: Subject to any disclaimer, the term of this patent is extended or adjusted under 35 U.S.C. 154(b) by 919 days.

This patent is subject to a terminal disclaimer.

(21) Appl. No.: 11/084,540

(22) Filed: Mar. 18, 2005

(65) Prior Publication Data

US 2005/0227032 A1 Oct. 13, 2005

Related U.S. Application Data

(63) Continuation of application No. 08/810,049, filed on Mar. 4, 1997, now Pat. No. 6,692,594.

(60) Provisional application No. 60/012,825, filed on Mar. 5, 1996.

(51) Int. Cl.
- *B32B 9/00* (2006.01)
- *B32B 33/00* (2006.01)
- *B32B 3/10* (2006.01)
- *A01K 29/00* (2006.01)

(52) U.S. Cl. ...................... 428/40.1; 428/41.7; 428/41.8; 428/42.2; 428/42.3; 428/98; 428/131; 428/906; 428/907; 119/712; 119/905

(58) Field of Classification Search ................. 428/40.1, 428/41.7, 41.8, 42.1, 42.2, 343, 42.3, 98, 428/131, 304.4, 906, 907; 43/107, 114; 119/712, 119/905

See application file for complete search history.

(56) References Cited

U.S. PATENT DOCUMENTS

| | | | |
|---|---|---|---|
| 2,911,756 A * | 11/1959 | Geary | 43/114 |
| 3,109,570 A * | 11/1963 | Maddalena | 225/66 |
| 3,517,450 A * | 6/1970 | Greco | 40/310 |
| 3,816,956 A * | 6/1974 | Sekula | 43/114 |
| 4,061,808 A | 12/1977 | Sato | |
| 4,341,828 A * | 7/1982 | Stephens | 428/40.1 |
| 4,348,440 A | 9/1982 | Kriozere | |
| 4,424,642 A * | 1/1984 | Stubler et al. | 43/114 |
| 4,587,146 A | 5/1986 | Anhauser et al. | |
| 4,832,228 A * | 5/1989 | Hickey | 119/174 |
| 4,892,999 A | 1/1990 | Wai-Kwan | |
| 4,961,525 A * | 10/1990 | Corbo et al. | 225/65 |
| 5,078,154 A | 1/1992 | Patel et al. | |
| 5,168,831 A * | 12/1992 | Ittershagen et al. | 119/712 |
| 5,209,973 A * | 5/1993 | Wille et al. | 428/352 |
| 5,210,581 A | 5/1993 | Kuzuya | |
| 5,215,089 A | 6/1993 | Baker, Jr. | |
| 5,246,775 A * | 9/1993 | Loscuito | 428/343 |
| 5,265,069 A | 11/1993 | Wardle | |
| 5,613,942 A * | 3/1997 | Lucast et al. | 602/52 |
| 5,622,761 A * | 4/1997 | Cole | 428/41.9 |
| 5,859,699 A | 1/1999 | Baer et al. | |

* cited by examiner

Primary Examiner — Patricia Nordmeyer
(74) Attorney, Agent, or Firm — Boyle Fredrickson, S.C.

(57) ABSTRACT

An apparatus and method is provided for controlling animal activity with an adhesive sheet. In one embodiment, the sheet includes strips uniformly spaced apart on a transfer layer including a bisected protection layer. In another embodiment, the sheet is flat and generally rectangular. In another embodiment, the sheet is rolled. In yet another embodiment, the sheet is deployed from a dispenser. In one embodiment of the method, the sheet is deployed by locating an area of activity to be controlled, removing the control sheet from the transfer sheet, placing the control sheet on an the area of activity to be controlled and then systematically and sequentially removing the first protection sheet and the second protection sheet. In another embodiment, the area to be controlled includes a surface discontinuity requiring placement of the control sheet along the discontinuity.

45 Claims, 7 Drawing Sheets

METHOD AND DEVICE FOR PREVENTING PETS FROM CLAWING HOME FURNISHINGS

CROSS-REFERENCES TO RELATED APPLICATIONS

This application is a continuation of U.S. application Ser. No. 08/810,049, filed Mar. 4, 1997, now U.S. Pat. No. 6,692,594 which claims the benefit of U.S. Provisional Application No. 60/012,825, filed Mar. 5, 1996.

FIELD OF THE INVENTION

This invention relates in general to animal control methods, and in particular to a method and device for preventing pets from clawing furniture or digging in potted plants.

BACKGROUND OF THE INVENTION

Some animals such as cats tend to naturally claw at or scratch home furnishings. If allowed to continue, such activity can significantly deface and even damage the furniture. Animals also defecate and meander in unwanted places. There are a number of methods for deterring many types of animals from causing and engaging in unwanted activity.

Prior art devices include those shown in Italy Patent No. 590,156, U.S. Pat. No. 4,587,146 to Anhäuser, et al.; *Claws and All: Living With Your Cat, Your Furniture, and Your Peace of Mind*, Rachel Lamb from the Spring 1996 HSUS News, © 1996 the HSUS; and *Basic Training for Your Cat*, © 1995 Bohnenkamp, Perfect Paws, Inc.

DETAILED DESCRIPTION OF EXEMPLARY EMBODIMENTS

Figure 1:
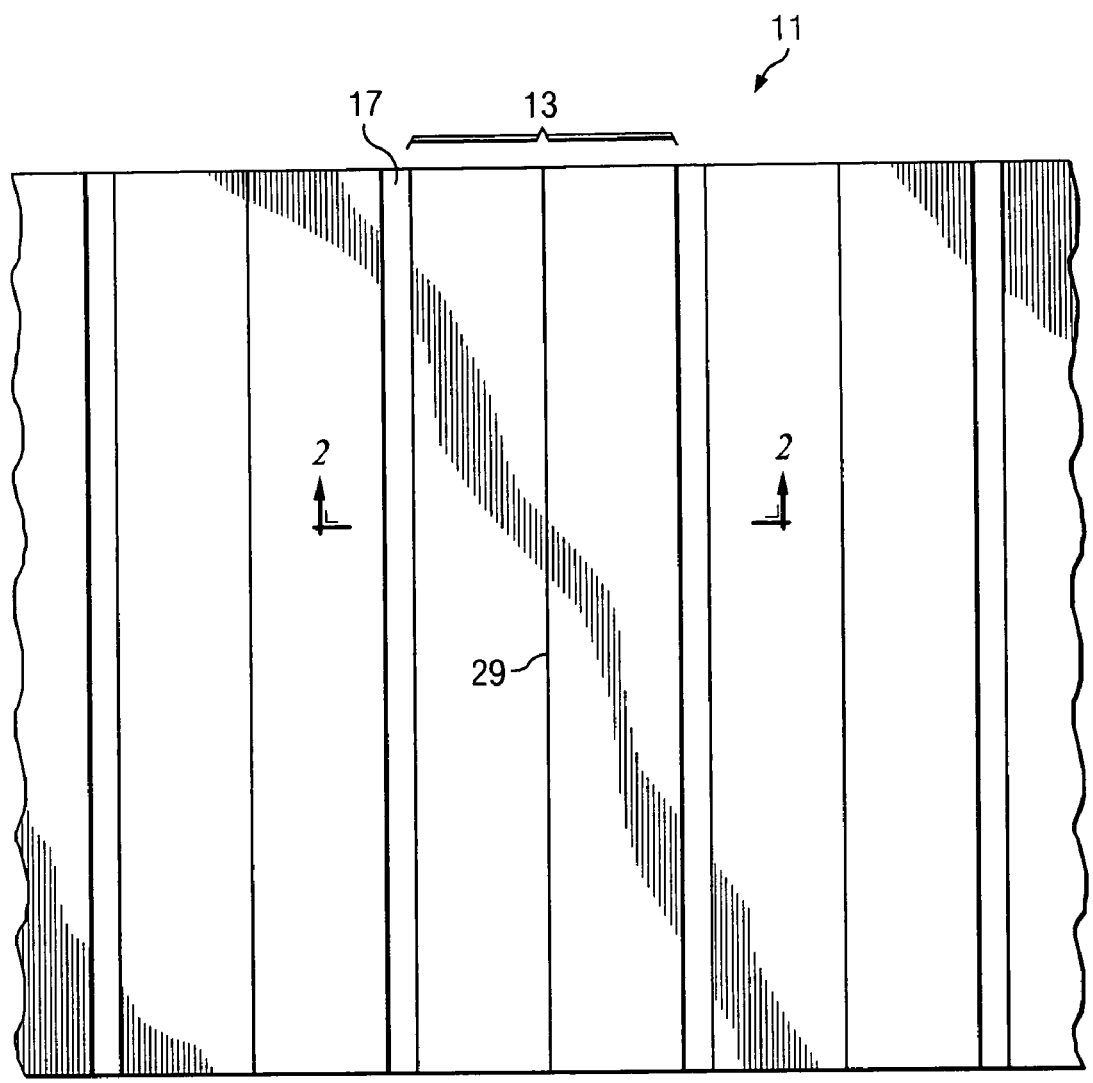
FIG. 1 is a plan view of an array of strips utilized in a method for preventing cats from clawing furniture and is constructed in accordance with the invention.
Figure 2:
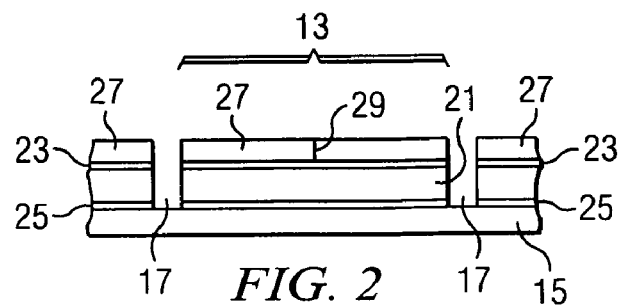
FIG. 2 is an enlarged, partial sectional view of the strips of FIG. 1 taken along the line 2-2 in FIG. 1.

Referring to FIGS. 1 and 2, an array 11 of multilaminate, rectangular strips 13 is shown. Each strip 13 is approximately twelve inches long and two inches wide. Strips 13 are affixed to a paper transfer sheet 15 and are uniformly spaced apart from one another by gaps 17. Each strip 13 has a plastic substrate or film 21 which provides the backing for two adhesive coating 23, 25 located on both sides of strip 13. Strips 13 and coatings 23, 25 are preferably transparent so as to appear substantially invisible when affixed to furniture. Coatings 23, 25 are preferably acrylic or a similar water based adhesive and can easily be removed from home furnishing fabrics. Coating 25 creates a releasable bond between film 21 and transfer sheet 15. The upper surface of transfer sheet 15 is treated with paraffin to facilitate easy removal of strips 13 from transfer sheet 15. A paper protective or release layer 27 is affixed to film 21 above coating 23. The lower surface of release layer 27 is treated with paraffin to facilitate easy removal of release layer 27 from film 13. In the embodiment shown, release layer 27 is longitudinally bisected into two separate portions as shown by cut 29.

Figure 3:
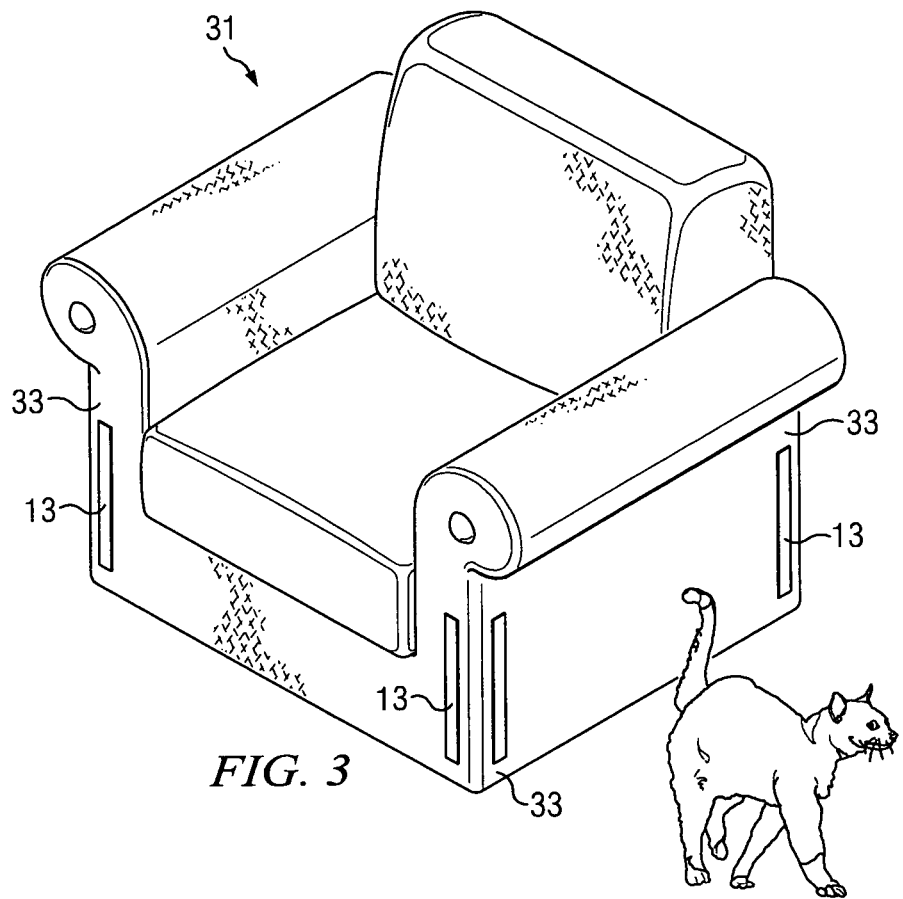
FIG. 3 is a schematic drawing of the strips of FIG. 1 affixed to furniture.

In operation, a strip 13 is peeled from transfer sheet 15 so that adhesive coating 25 is exposed. Gaps 17 between strips 13 provide an indication of the side margins of each strip 13 so as to not confuse cut 29 with the side margins. Referring to FIG. 3, the user then presses strip 13 against an item of furniture 33, a countertop, or other object where a cat may tread or tend to "sharpen" its claws. Coating 25 removably affixes strip 13 to fabric home furnishings such as drapery or an item of furniture 31 along an outer surface 33. If necessary, strip 13 may be repositioned after it is affixed to furniture 31. Finally, release layer 27 is easily removed from strip 13 by peeling the two portions of release layer 27 along cut 29, thereby exposing coating 23. These steps are then repeated for each surface 33 that is susceptible to be scratched. Since it is transparent, strip 13 is not readily visible after release layer 27 is removed. When a cat attempts to scratch furniture 31, its paw contacts and receives an unpleasant sticking sensation from exposed adhesive coating 23, deterring the cat from future contact with that item of furniture 31. Coating 25 is of sufficient strength so as to remain affixed to furniture 31 when cats or other pets attempt to scratch furniture 31.

Figure 4:
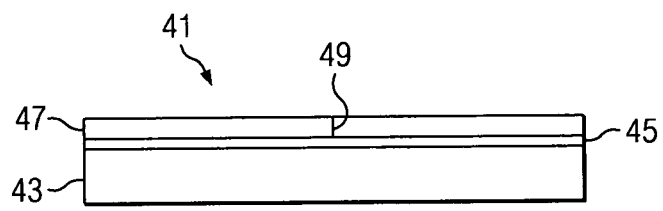
FIG. 4 is a sectional view of an alternate embodiment of the invention.

An alternate embodiment of the invention is shown in FIG. 4. Strip 41 has a rectangular corrugated plastic substrate 43 which provides the backing for an adhesive coating 45 located on an upper side of strip 41. There is no coating of adhesive on the lower side of strip 41. Substrate 43 and coating 45 are impervious to water. Substrate 43 is fairly rigid and is preferably colored to blend in with soil. Coating 45 creates a bond between substrate 43 and a paper release layer 47. The lower surface of release layer 47 is treated with paraffin to facilitate easy removal of release layer 47 from substrate 43. Release layer 47 is longitudinally bisected into two portions by a cut 49. The size of each strip 41 may vary, but is typically about the same size as strip 13 of the first embodiment. If necessary, strip 41 may be cut or trimmed to meet a particular application.

Figure 5:
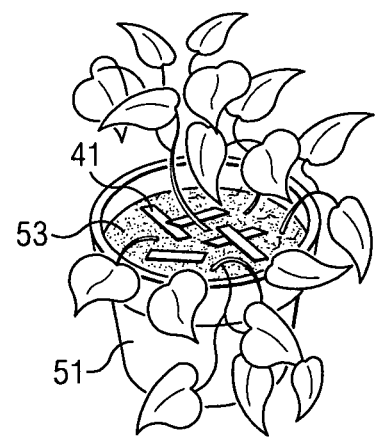
FIG. 5 is a schematic drawing of the embodiment of FIG. 4 in use.

In operation, release layer 47 is easily removed from strip 41 by peeling release layer 47 along cut 49, thereby exposing coating 45. Referring to FIG. 5, strip 41 is placed in a potted houseplant 51 so that the lower, nonadhesive side of substrate 43 lies in contact with soil 53. Preferably, a plurality of strips 41 are placed on soil 53 and overlapped transverse to one another. When strips 41 are overlapped, the coating 45 on one strip 41 sticks to the non-coated side of another strip 41. This alignment creates an array of strips that is not easily lifted by a pet. When a cat attempts to dig in soil 53, it contacts and receives an unpleasant sticking sensation from exposed adhesive coating 45 and is deterred from future contact with soil 53 of houseplant 51.

Figure 6:
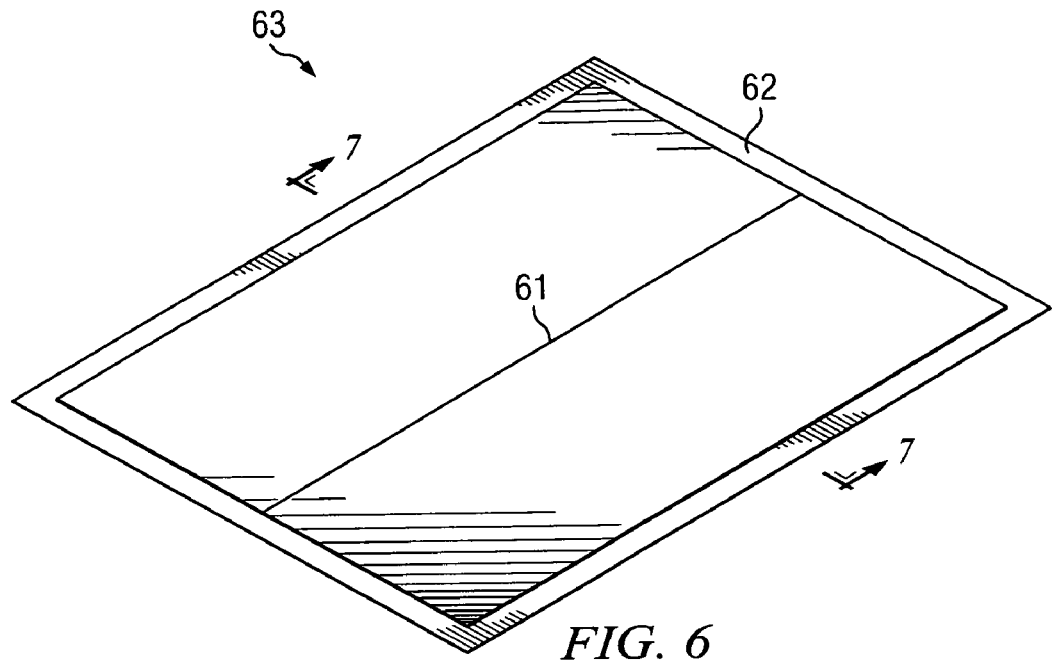
FIG. 6 is an isometric view of the strip of one embodiment of the present invention.
Figure 7:
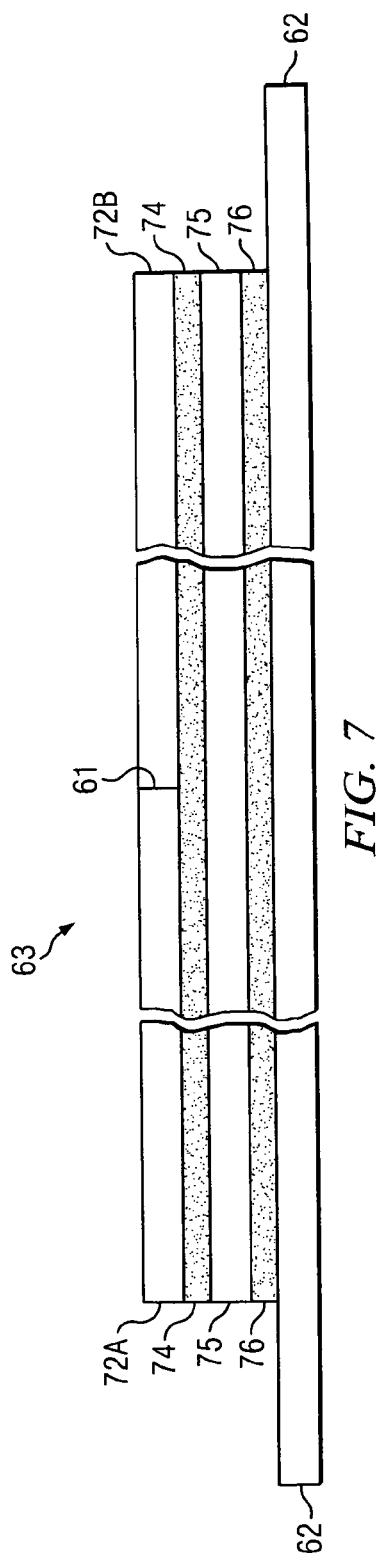
FIG. 7 is an enlarged, partial sectional view of the strip of FIG. 1 taken along the line A-A of FIG. 6.

Referring to FIGS. 6 and 7, an alternate embodiment of the invention is shown as strip 63. In the alternate embodiment, strip 63 is approximately 11 inches long and 8 inches wide. In the preferred embodiment, the surface area is rectangular tape about 16 square inches. Strip 63 is affixed to paper transfer layer 62. In the preferred embodiment, the transfer layer 62 is approximately 12 inches long and 9 inches wide. Of course other dimensions of the strip and transfer sheet can be used with equal success. Other shapes besides rectangular could be provided in alternative embodiments, as well, such as polygons or ellipses.

Referring to FIG. 7, a side view of strip 63 is shown. It is comprised of five layers. The first layer, transfer layer 62, is a wax coated paper. In other embodiments, transfer layer 62 can be a thin polypropylene sheet or other sheet materials having at least one slick surface. The second layer is first adhesive coating 76. First adhesive coating 76 in the preferred embodiment is a water based adhesive which can easily be removed and reattached from objects such as home furnishings or carpets. In the preferred embodiment, first adhesive coating 76 is a polyacrylate adhesive which is transparent, odorless and tasteless. In other embodiments first adhesive coating 76 can be styrene-isoprene-styrene, styrene-butadiene-styrene, poly(butyl acrylate), poly(2-octyl acrylate), styrene-isoprene-styrene or poly(ethylhexyl acrylate). In any of the embodiments described herein, a scented adhesive, such as a citrus scent, can be employed. All embodiments could also be coated with agents with a disagreeable taste, such as a citrus flavor. Also any of the embodiments can have color or designs can be added to the adhesive. The thickness of first adhesive coating 76 is approximately one to two mils thick. Other thickness of adhesive can be used. The greater the thickness of first adhesive coating 76, the easier it will be to remove strip 63 when it has been affixed to a surface.

The third layer is transparent layer 75. First adhesive coating 76 adheres to one side of transparent layer 75, forming a bond not easily removed. In the preferred embodiment, transparent layer 75 is a transparent polypropylene sheeting approximately one to two mils thick. In an alternate embodiment, colors and designs can be added to transparent layer 75. Thicknesses of up to five mils can be used depending on the desired application of the embodiment. The durability and rigidity of the sheet increases as the thickness increases. As will be obvious to those skilled in the art, the economy of the transparent layer increases as the thickness decreases.

In an alternate embodiment first adhesive coating 76 is intermittently applied to the strip. The placement of first adhesive coating 76 can be applied to less than the full surface area of layer 75. For instance, the adhesive coating may be applied in a pattern or shape. First adhesive coating 76 can also be arranged in parallel lines, non-parallel serpentine patterns or in other patterns. If colored, the adhesive can take on decorative patterns such as floral patterns. In one preferred embodiment, the adhesive is arranged in a series of parallel lines lengthwise on layer 75. In this embodiment, the width of each parallel line is about 2 millimeters. The space between the lines is about one centimeter. The resulting adhesive coverage is about 20% of the surface of layer 75. Smaller layer percentages of coverage can be employed in different embodiments to adjust adhesive coverage to delicate or robust surfaces.

The fourth layer comprises second adhesive coating 74. Second adhesive coating 74 is preferably a polyacrylate adhesive or other similar water based adhesive which is transparent, non-toxic, odorless and tasteless. In other embodiments second adhesive coating 74 can be styrene-isoprene-styrene, styrene-butadiene-styrene, poly(butyl acrylate), poly(2-octyl acrylate), styrene-isoprene-styrene or poly(ethylhexyl acrylate). Second adhesive coating 74 adheres to a surface of transparent coating 75 with a bond not easily removed. In the preferred embodiment, first adhesive coating 76 and second adhesive coating 74 are both water based adhesives. In any of the embodiments described herein, at least first adhesive coating 74 or second adhesive coating 76 can be formed of a water insoluable adhesive.

The fifth layer of alternative embodiment 63 is a release layer separated into two pieces 72a and 72b. In the preferred embodiment, the pieces are wax coated paper. However, in other embodiments, a thin polypropylene plastic or other flexible sheet can be used. As can be seen from FIG. 6, pieces 72a and 72b are separated by a dividing line 61 along the long axis of transfer layer 62. In any of the embodiments described herein, release layer 72a and 72b can be separated along an axis or diagonally, depending on the application desired. In an alternative embodiment, words, designs or colors may be added to the exposed surface of pieces 72a and 72b.

Figure 8:
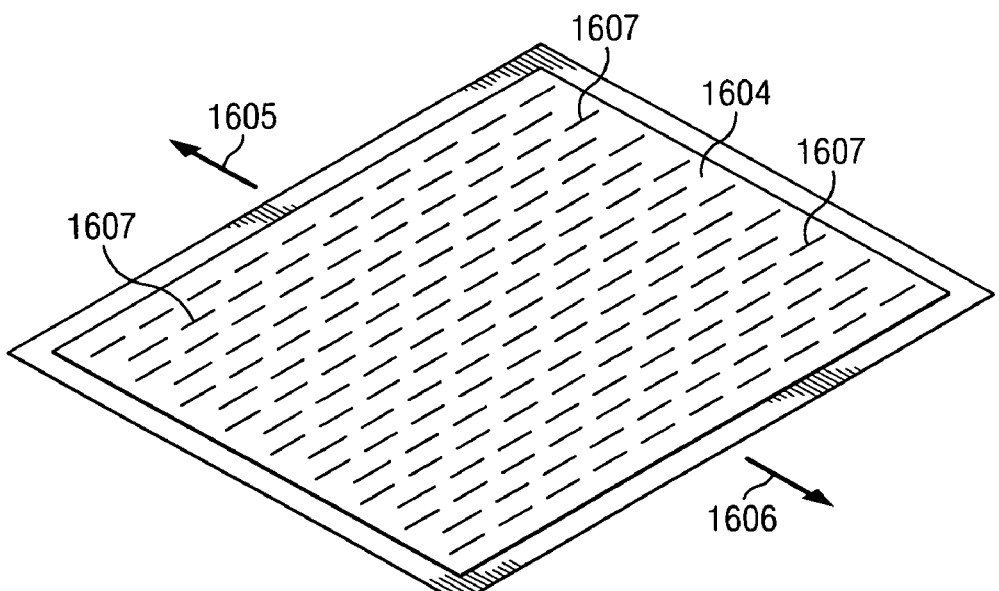
FIG. 8 is an isometric view of the perforated embodiment of the invention.
Figure 9:
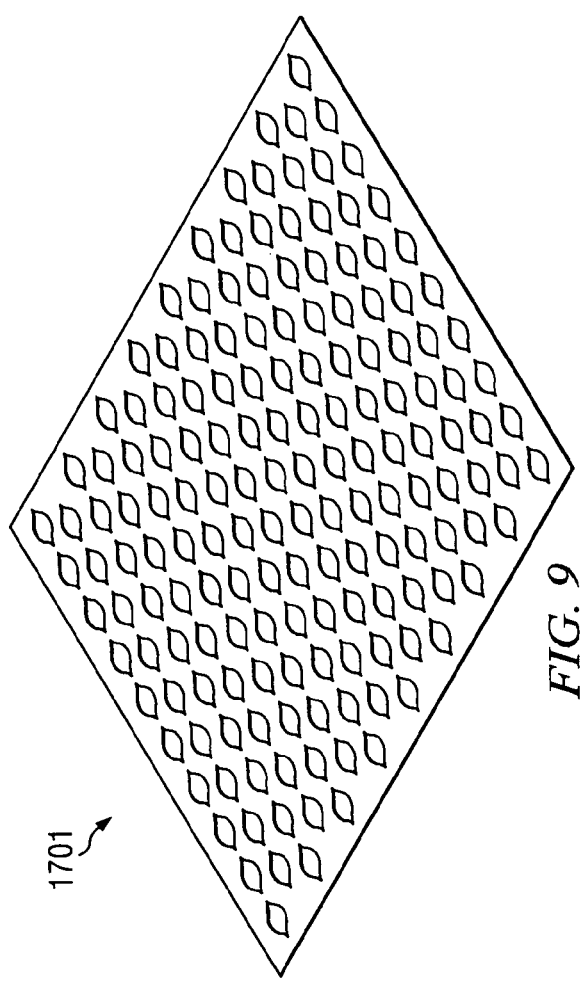
FIG. 9 is the stretched perforated embodiment of the invention.
Figure 10:
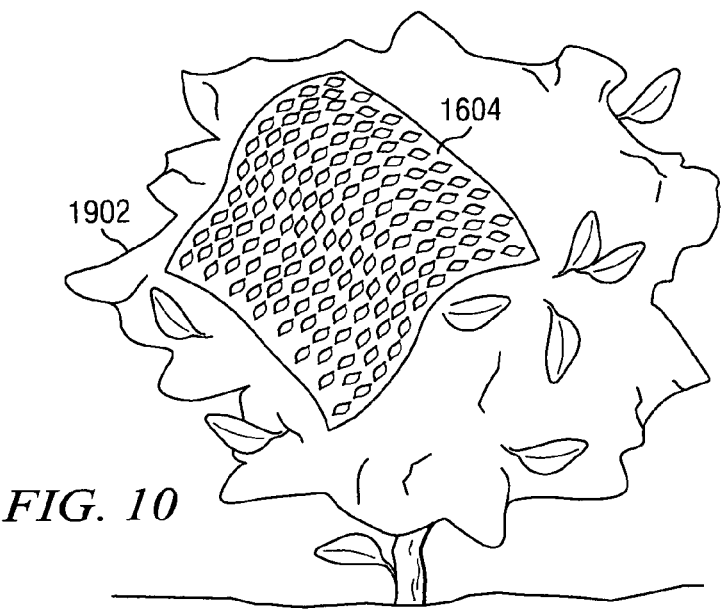
FIG. 10 is a schematic representation of a FIG. 8 in use

FIG. 8 shows an alternate embodiment of the invention. In this embodiment, the device contains diagonally staggered perforations 1607. Perforations 1607 are cut into the strip by a roller or other available means known in the art. In the preferred embodiment, each linear perforation 1607 is approximately one inch long and occurs at a frequency of three perforations per square inch. Of course other dimensions and frequencies of perforations can be used with equal success. The greater the number of perforations, the more the strip can be expanded. In use, after transparent layer 75 is peeled from transfer layer 62, transparent layer 75 is expanded by stretching the strip outward, as shown by arrows 1605 and 1606, in a direction perpendicular to the linear length of the perforations. FIG. 9 shows expanded perforated strip 1701. All five layers of the strip can be perforated or only the transparent layer can be perforated. FIG. 10 shows use of this embodiment on an irregular surface 1902.

For any of the embodiments disclosed herein, the desired locations can be carpets, floors, dirt, patios or other generally horizontal surfaces to prevent unwanted defecation or meandering or walls, drapes, furniture, plant stems, trees, wires, lamp posts, trashcans, BBQ grills or other generally vertical surfaces to prevent scratching or clawing of animals. The embodiments with incidental placement of adhesive are suited to be used on delicate areas such as vehicles, vehicle covers and fine fabrics. Perforated embodiments are well suited for irregular shaped objects such as bushes and fences, but can also be used with equal success on other horizontal or vertical surfaces. Any of the embodiments disclosed herein can also be used with equal success to deter the behavior of birds, rodents, or other animals.

In use, transparent layer 73 is peeled from transfer layer 62, leaving adhesive coating 76 on transparent layer 73 exposed. Two piece release layer 72a and 72b remains affixed to transparent layer 75 to give rigidity to transparent layer 73 and to aid in positing the strip.

First adhesive coating 76 is pressed onto the desired surface by an application of pressure to the exposed surface of release layer 72a and 72b. If necessary, strip 63 may be reposition after it is affixed. Two piece release layer 73 remains affixed to strip 63 to aid in repositioning. Release layer 72a and 72b is removed from strip 63 by peeling the two separate portions of the release layer along division 61, one at a time, thereby exposing second adhesive coating 74.

Figure 11:
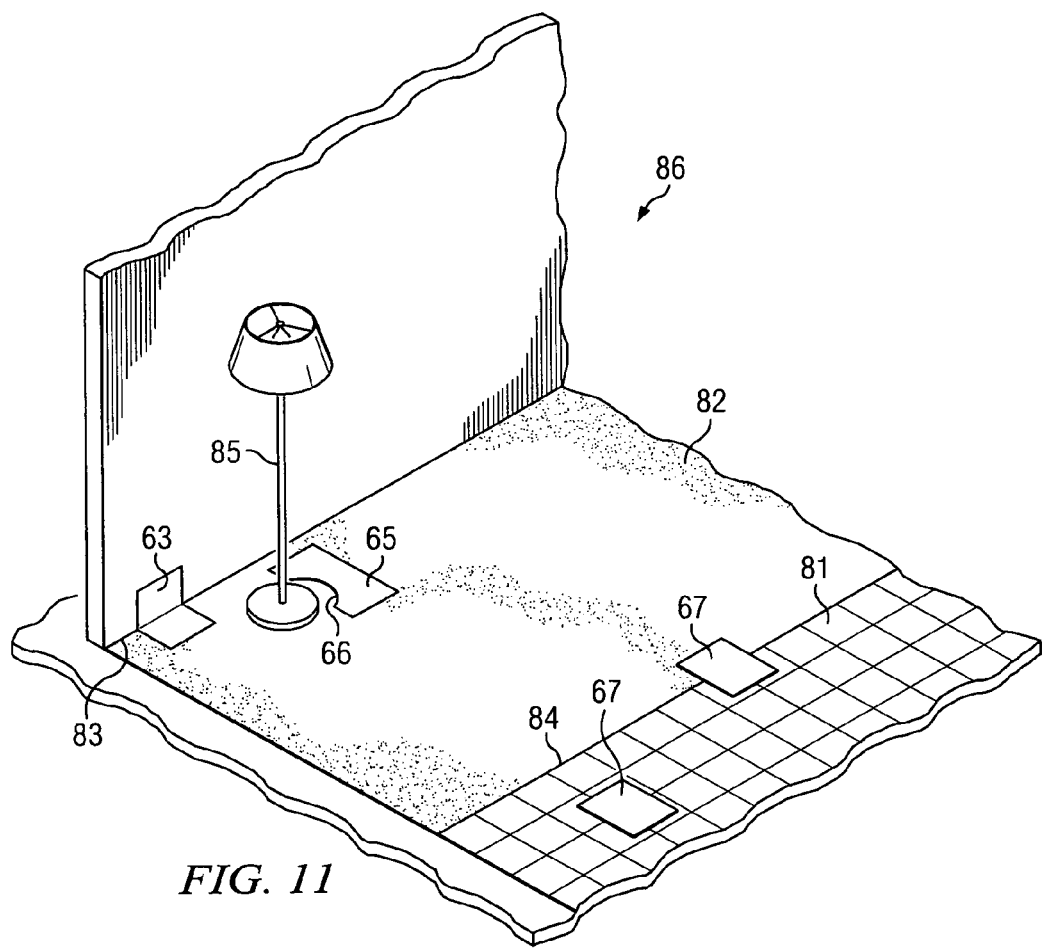
FIG. 11 is a schematic representation of various applications of one embodiment of the invention.

FIG. 11 shows use of the invention in environment 83. Environment 83 includes corner 83, furniture 85, horizontal carpet surface 82 and horizontal slick surface 81. Strip 63 is shown in position along corner 83. In this location, first adhesive coating 76 is pressed against corner 83 along division 61 between two-piece release layer 72a and 72b. Release layers 72a and 72b are removed from strip 63 by peeling each piece one at a time. It will be appreciated by those in the art that it would be difficult or impossible to remove release layers 72a and 72b if they were in fact one piece. Wrinkling, tearing and damage to transparent layer 75 would occur in this instance.

Still referring to FIG. 11, an item of furniture 85 is shown. In this usage, the invention is cut along shape 66 to match or avoid item of furniture 85, at 66. After modifying strip 65 by cutting, the transparent layer is removed from the transfer layer and positioned as desired. Then, the release layer is removed a strip at a time and positioned on carpet surface 82.

In another application, strip 67 is placed on flat surface 81 in the area where the presence of the pet is to be deterred.

In another application, strip 67 is placed along interface 84 between carpet surface 82 and flat surface 81. In this application, transparent layer 73 at strip 67 is placed along interface 84 generally aligning division 61 with the interface. Two-piece release 72a and 72b is then removed one strip at a time to prevent damage to transparent layer 73.

Figure 12:
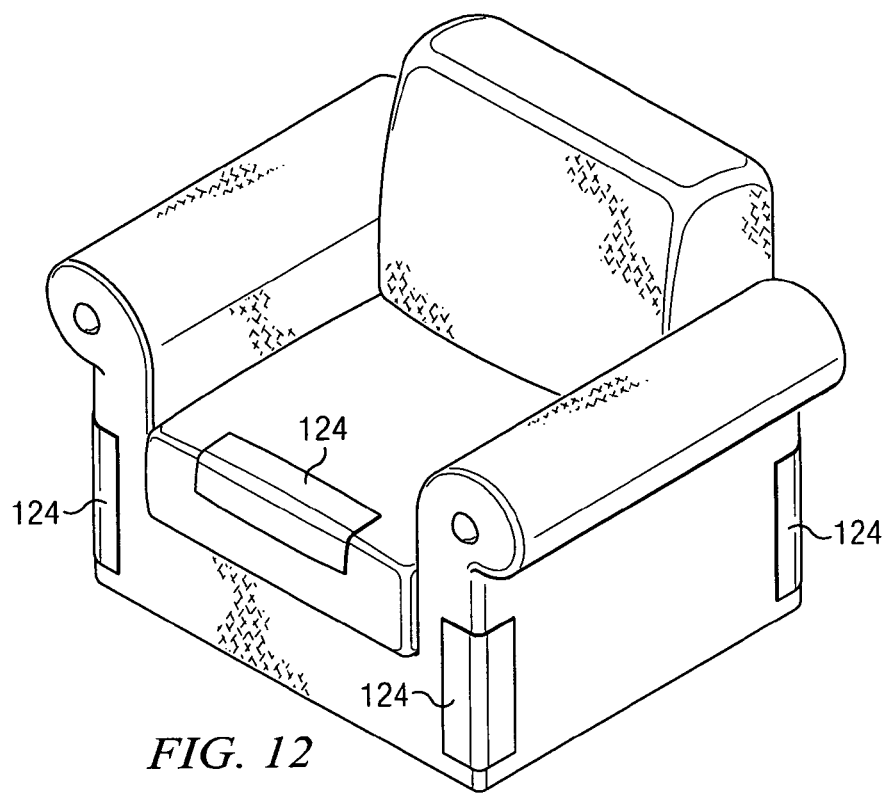
FIG. 12 is a schematic drawing of one embodiment of the invention affixed to corners of a piece of furniture.

In an alternative embodiment of the method of the invention, the transfer layer and release layer can be placed on the corner of an object. For example, referring to FIG. 12, an alternate embodiment of the preferred invention is shown deploying the release layer and transparent layer on a corner of the surface. The steps of this alternate embodiment include removing the transparent layer from the transfer layer, placing the first adhesive layer along one side of the corner, centering the corner along the axis of the cut, bending the transparent layer along the axis of the cut, pressing the second side of the transparent layer 124 against the article and finally removing release layer 72a and finally removing release layer 72b. In this alternate embodiment of the method, division 61 allows the release layers 72a and 72b to be removed without being torn. Of course, this method can be applied to corners of any orientation such as horizontal corner 123. Deploying the invention along a corner as described is very difficult with a single release layer as in the prior art.

If transparent, second adhesive coating 74 and transparent layer 75 are not readily visible after release layer 72a and 72b are removed. Coating 74 is of sufficient thickness and strength to remain affixed to the surfaces to which they are affixed when repeatedly contacted.

Referring to FIG. 10, use of an alternative embodiment is pictured. In this embodiment, the release layer is removed from a transparent layer. The perforated transparent layer, still attached to the perforated release layer, is then stretched perpendicularly to the axis of the perforations expanding the coverage area of the device. The transparent layer is then placed on the irregular object and the release layer is removed.

Figure 13:
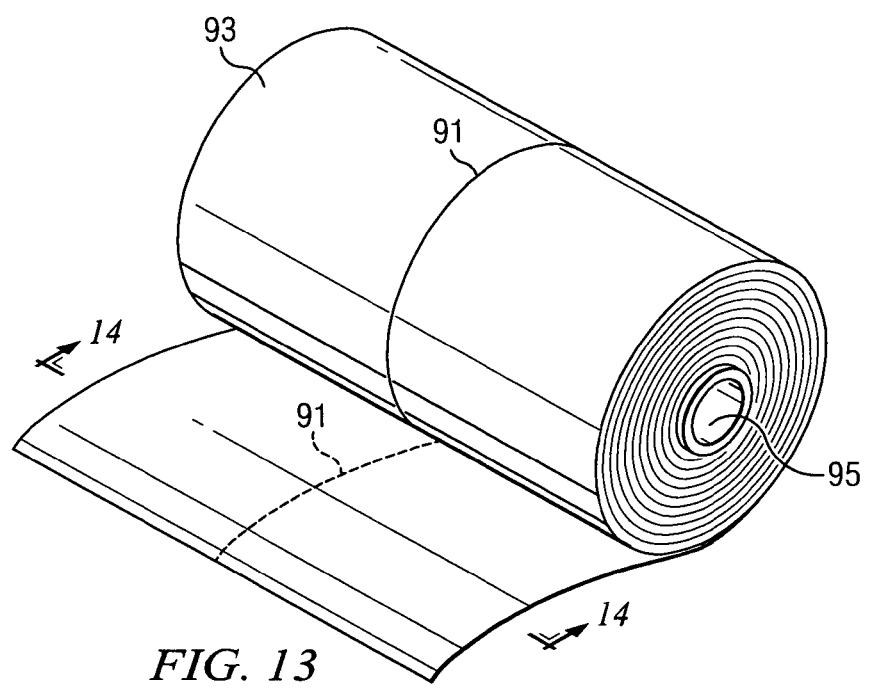
FIG. 13 is an isometric view of the multilaminant layer embodiment of the invention.
Figure 14:
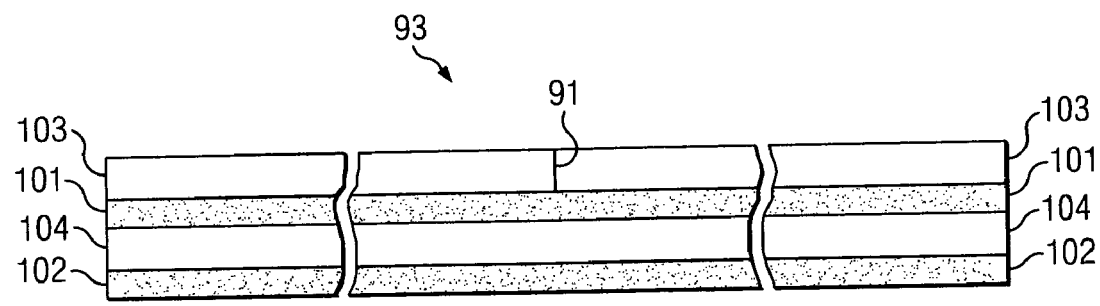
FIG. 14 is an enlarged, partial sectional view of the strip of FIG. 16 taken along the line B-B of FIG. 16.

Referring to FIGS. 13 and 14, an alternate embodiment is shown as a cylinder of multilayer laminate 93. In this preferred embodiment, multilayer laminate 93 is approximately 96 inches long and two inches wide. In the preferred embodiment, the length of the multilayer laminate is much longer than its width, but of course other the dimensions can be used with equal success.

Referring to FIG. 14, each layer of multilayer laminate 93 has four layers. The first layer, film 104, provides backing for two adhesive coatings 101 and 102. The fourth layer, two piece release layer 103, is releasably adhered to film 104 by coating 101. Coatings 101 and 102 are preferably polyacrylate or a similar water based adhesive. In an alternate embodiment, coating 102 is ¼ square inch wide located perpendicular to the axis of film 104. Of course other widths of first adhesive coating 76 border, or other arrangements of intermit adhesive coatings can be used with equal success. This embodiment allows transparent layer 75 to be removably adhered to a surface without required the adhesive coating to cover the entire surface covered by transparent layer 75. The upper and lower surfaces of two piece release layer 103 are treated with paraffin to facilitate easy removal of film 104. In the embodiment shown, two piece release layer 103 is longitudinally bisected into two separate portions along division 91. In an alternate embodiment, release layer 103 can be bisected multiple times along other axes. In this embodiment, the referenced layer is segmented into multiple pieces, for example, along an axis parallel to the axis of the roll.

As shown in FIG. 13, the multilayer laminate is comprised of a spooled strip in which coating 102 is in contact with the top surface of release layer 103 in successive layers. Multilayer laminate 93 is spooled on a rigid cylinder 95. In the preferred embodiment, the cylinder is made of cardboard but could also be made of a rigid plastic or a light metal. In operation, multilayer laminate 93 is unwound from cylinder 95 to a desired length, exposing coating 102. The desired length of multilayer laminate 93 is separated from the cylinder by using a cutting utensil such as scissors or a razor blade.

Figure 15:
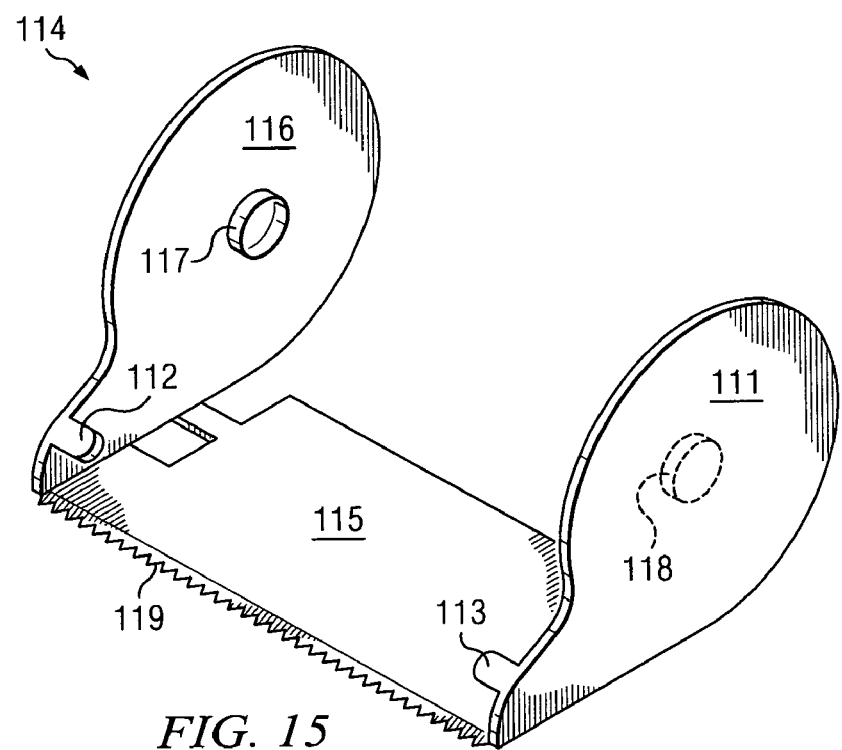
FIG. 15 is an isometric view of one embodiment of the dispensing housing of the invention.

Referring to FIG. 15, housing 114 can be used to facilitate the detachment of multilayer laminate 93 from cylinder 96. Housing 114 is comprised of two generally parallel cylinder supports 117 and 111. Cylinders 117 and 111 are connected by support bar 115 and serrated edge 113. Cylinder support 116 includes inward facing support cylinder 117 and inward facing support cylinder 118 which are diametrically opposed and attached to cylinder support 116 and cylinder support 111, respectively. Cylinder support 116 includes tab 112. Diametrically opposed is tab 113 which is attached to cylinder support 111. Housing 114 in the preferred embodiment is made of a polypropylene plastic which is colored as desired. Of course, other plastics and flexible metals can be used as well. In the preferred embodiment, serrated edge 119 is made of a light metal, but can also be formed from the same material as housing 114.

In use, cylinder 95 and multilayer laminate 93 is placed in between cylinder support 116 and cylinder support 111 and held in place by cylinder support 117 and cylinder support 118. The diameters of cylinder support 117 and cylinder support 118 are sized so as to be slightly less than cylinder support 95. The result is that cylinder 95 is allowed to rotate with respect to cylinder support 117 and cylinder support 118. Multilayer laminate 93 is then unwound and fed over support bar 115 and under tabs 112 and 113 and pulled along serrated edge 119

In operation, the desired length of multilayer laminate 93 is pulled from cylinder 96 and separated by using serrated edge strip 119. The serrated edge 119 can be composed of a variety of different materials such as plastics and metals, which are sufficient to detach multilayer 93 from cylinder 96.

This invention is susceptible to considerable variation in its practice. Accordingly, this invention is not limited to the specific exemplifications set forth herein above. Rather, this invention is within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part of the invention under the doctrine of equivalents.

The invention clamed is:

1. A device for controlling pet behavior comprising:
    a transfer sheet;
    a control sheet adjacent to the transfer sheet;
    a bisected release layer, adjacent to the control sheet, including a first release sheet and a second release sheet bisected by a linear axis;
    wherein the first release sheet runs parallel to and does not have an overlapping cross-sectional area with the second release sheet;
    wherein the second release sheet runs parallel to and does not have an overlapping cross-sectional area with the first release sheet;
    a first adhesive layer, between the transfer sheet and the control sheet, adhering to the control sheet;
    a second adhesive layer, between the control sheet and the bisected release sheet, adhering to the control sheet; and
    wherein the first release sheet and the second release sheet abut but do not overlap the linear axis.

2. The device of claim 1 wherein the control sheet further comprises a linear perforation means for allowing planar expansion of the control sheet.

3. The device of claim 1 wherein the control sheet is transparent.

4. The device of claim 1 wherein the control sheet is colored.

5. The device of claim 1 wherein the control sheet is ornamented with a design.

6. The device of claim 1 wherein the adhesive is tasteless.

7. The device of claim 1 wherein the adhesive is citrus flavored.

8. The device of claim 1 wherein the adhesive is odorless.

9. The device of claim 1 wherein the adhesive has an odor of citrus.

10. The device of claim 1 wherein the adhesive is water based.

11. The device of claim 1 wherein at least one adhesive is water insoluble.

12. The device of claim 1 wherein at least one of the first adhesive layer and the second adhesive layer is polyacrylate.

13. The device of claim 1 wherein at least one of the first adhesive layer and the second adhesive layer is chosen from the group comprising: styrene-isoprene-styrene, styrene-butadiene-styrene, poly(butyl acrylate), poly(2-octyl acrylate), styrene-isoprene-styrene and poly(ethylhexyl acrylate).

14. The device of claim 1 wherein first adhesive layer comprises an adhesive strip along the perimeter of the control sheet and wherein the adhesive strip results in an adhesive coverage of about 20% of the control sheet.

15. The device of claim 1 wherein the first adhesive layer is intermittently dispensed on the control sheet and wherein the first adhesive layer results in an adhesive coverage of about 20% of the control sheet.

16. The device of claim 1 wherein the bisected release layer is ornamented with a design.

17. The device of claim 1 wherein the transfer sheet is rectangular.

18. The device of claim 1 wherein the transfer sheet is oval.

19. The device of claim 1 wherein the transfer sheet is polygonal.

20. A device for controlling pet behavior comprising:
    a control sheet with an adhesive first layer and an adhesive second layer;
    a bisected release sheet means, adjacent to the control sheet, to aid in application of the control sheet;
    the bisected release sheet means including at least a first release sheet and a second release sheet;
    the control sheet and bisected release sheet means rolled on a cylinder core tube;
    a support frame for pivotally holding the cylinder and dispensing and cutting the control sheet and bisected release sheet means; and
    the support frame having a first cylinder support with a first tab adjacent the cylinder core tube, parallel and connected by a serrated bar to, a second cylinder support with a second tab adjacent the cylinder core tube.

21. The device of claim 20 wherein the control sheet comprises linear perforations arranged in a diagonal pattern which cooperate to provide flat expansion of the control sheet when a set of diametrically opposing forces is applied to the control sheet.

22. The device of claim 20 wherein the first release sheet and the second release sheet are adjacent to an axis of the control sheet.

23. The device of claim 20 wherein the adhesive is water based.

24. The device of claim 20 wherein the adhesive is water insoluble.

25. The device of claim 20 wherein at least one of the first adhesive layer and the second adhesive layer is polyacrylate.

26. The device of claim 20 wherein at least one of the first adhesive layer and the second adhesive layer is chosen from the group comprising: styrene-isoprene-styrene, styrene-butadiene-styrene, poly(butyl acrylate), poly(2-octyl acrylate), styrene-isoprene-styrene and poly(ethylhexyl acrylate).

27. The device of claim 20 wherein the first adhesive layer is intermittently dispensed on the control sheet and wherein the adhesive layer results in an adhesive coverage of about 20% of the control sheet.

28. The device of claim 20 wherein the bisected release sheet means is ornamented.

29. A device for controlling pet behavior comprising:
    a transfer sheet;
    a control sheet adjacent to the transfer sheet;
    a bisected release layer, adjacent to the control sheet, including a first release sheet and a second release sheet separated by a central linear axis;
    wherein the first release sheet runs parallel to and does not have an overlapping cross-sectional area with the second release sheet;
    wherein the second release sheet runs parallel to and does not have an overlapping cross-sectional area with the first release sheet;
    a first adhesive layer, between the transfer sheet and the control sheet, adhering to the control sheet;
    a second adhesive layer, between the control sheet and the bisected release sheet, adhering to the control sheet; and
    wherein the first release sheet and the second release sheet are adjacent to each other and do not overlap the central linear axis.

30. The device of claim 29 wherein the control sheet includes linear perforations for expanding the surface area covered by the control sheet.

31. The device of claim 29 wherein the control sheet is transparent.

32. The device of claim 29 wherein the control sheet is colored.

33. The device of claim 29 wherein the control sheet is ornamented with a design.

34. The device of claim 29 wherein the adhesive is tasteless.

35. The device of claim 29 wherein the adhesive is citrus flavored.

36. The device of claim 29 wherein the adhesive is odorless.

37. The device of claim 29 wherein the adhesive has an odor of citrus.

38. The device of claim 29 wherein the adhesive is water based.

39. The device of claim 29 wherein at least one adhesive is water insoluble.

40. The device of claim 29 wherein at least one of the first adhesive layer and the second adhesive layer is polyacrylate.

41. The device of claim 29 wherein at least one of the first adhesive layer and the second adhesive layer is chosen from the group comprising: styrene-isoprene-styrene, styrene-butadiene-styrene, poly(butyl acrylate), poly(2-octyl acrylate), styrene-isoprene-styrene and poly(ethylhexyl acrylate).

42. The device of claim 29 wherein first adhesive layer comprises an adhesive strip along the perimeter of the control sheet and wherein the adhesive strip results in an adhesive coverage of about 20% of the control sheet.

43. The device of claim 29 wherein the first adhesive layer is intermittently dispensed on the control sheet and wherein the first adhesive layer results in an adhesive coverage of about 20% of the control sheet.

44. The device of claim 29 wherein the bisected release layer is ornamented with a design.

45. The device of claim 29 wherein the transfer sheet is one of the following shapes: rectangular, oval or polygonal.

* * * * *